United States Patent
Peng et al.

(10) Patent No.: US 10,802,500 B2
(45) Date of Patent: Oct. 13, 2020

(54) DETERMINING METHOD AND CONTROL METHOD FOR STRAIGHT RUNNING OF ROBOT ON SLOPE PLANE

(71) Applicant: SUZHOU RADIANT PHOTOVOLTAIC TECHNOLOGY CO., LTD, Suzhou, Jiangsu (CN)

(72) Inventors: Fang Peng, Jiangsu (CN); Yanrong Zhou, Jiangsu (CN); Jianrong Xu, Jiangsu (CN)

(73) Assignee: SUZHOU RADIANT PHOTOVOLTAIC TECHNOLOGY CO., LTD, Suzhou, Jiangsu (CN)

( * ) Notice: Subject to any disclaimer, the term of this patent is extended or adjusted under 35 U.S.C. 154(b) by 92 days.

(21) Appl. No.: 16/335,387

(22) PCT Filed: Jan. 26, 2017

(86) PCT No.: PCT/CN2017/072762
§ 371 (c)(1),
(2) Date: Jul. 2, 2019

(87) PCT Pub. No.: WO2018/053983
PCT Pub. Date: Mar. 29, 2018

(65) Prior Publication Data
US 2020/0012291 A1  Jan. 9, 2020

(30) Foreign Application Priority Data
Sep. 21, 2016 (CN) .......................... 2016 1 0836069

(51) Int. Cl.
| | |
|---|---|
| G05D 1/02 | (2020.01) |
| B25J 9/16 | (2006.01) |
| B25J 11/00 | (2006.01) |
| H02S 40/10 | (2014.01) |

(52) U.S. Cl.
CPC ............ G05D 1/027 (2013.01); B25J 9/1664 (2013.01); B25J 11/0085 (2013.01); H02S 40/10 (2014.12);
(Continued)

(58) Field of Classification Search
CPC ..... A47L 11/38; A47L 2201/04; B25J 9/1664; B25J 11/0085; B62D 55/26;
(Continued)

(56) References Cited

U.S. PATENT DOCUMENTS

| | | | |
|---|---|---|---|
| 5,083,629 A | 1/1992 | Chang | |
| 2013/0024067 A1* | 1/2013 | Troy | B64F 5/30 701/36 |

(Continued)

FOREIGN PATENT DOCUMENTS

| | | |
|---|---|---|
| CN | 103744425 A | 4/2014 |
| CN | 104155975 A | 11/2014 |

(Continued)

Primary Examiner — Dale Moyer
(74) Attorney, Agent, or Firm — Mark M. Friedman

(57) ABSTRACT

An objective of the present invention is to provide a method for determining and controlling a robot to move straightly on a sloping plane to solve a technical issue that a deviation of a conventional robot from a predetermined straight path is difficult to detect when the robot moves on a sloping plane and cannot be corrected, and moving on the straight path is difficult to guarantee.

8 Claims, 8 Drawing Sheets

(52) U.S. Cl.
CPC .. *A47L 2201/04* (2013.01); *G05D 2201/0203* (2013.01)

(58) Field of Classification Search
CPC ..... B62D 55/265; B62D 57/024; F24S 40/20; G05D 1/02; G05D 1/021; G05D 1/0212; G05D 1/0219; G05D 1/0227; G05D 1/0268; G05D 1/027; G05D 1/0272; G05D 2201/0203; H02S 40/10; Y10S 901/01
See application file for complete search history.

(56) References Cited

U.S. PATENT DOCUMENTS

2015/0272413 A1* 10/2015 Miyake ................ F24S 40/20
701/23
2015/0366130 A1* 12/2015 Bergstrom ............. A01D 75/28
701/23
2017/0157775 A1* 6/2017 Miyake .................... A47L 9/04

FOREIGN PATENT DOCUMENTS

| CN | 104181925 A | 12/2014 |
| CN | 204044623 U | 12/2014 |
| CN | 104644061 A | 5/2015 |
| CN | 106182015 A | 12/2016 |
| CN | 106272331 A | 1/2017 |
| CN | 106325276 A | 1/2017 |
| CN | 106584454 A | 4/2017 |
| CN | 206154318 U | 5/2017 |
| JP | H03148707 A | 6/1991 |
| JP | H095104 A | 1/1997 |
| JP | 2000330638 A | 11/2000 |

* cited by examiner

DETERMINING METHOD AND CONTROL METHOD FOR STRAIGHT RUNNING OF ROBOT ON SLOPE PLANE

FIELD OF INVENTION

The present invention relates to a field of robot application, and especially to a determining method and a controlling method for a robot to move straightly on a sloping plane.

BACKGROUND OF INVENTION

As fossil fuels available are in a decline, new renewable solar energy has become an important part of energy used by humans. Solar energy technology has been rapidly developed in all countries in the world over the past decade. A solar panel is a device that converts solar energy directly into electrical energy using semiconductor materials that generate photovoltaic (PV) effect when exposed to sunlight. The solar panels are suitable for applications ranging from large power stations to small portable chargers. In recent years, the solar panels have had been rapidly developed.

Work environment of the solar panels can only be outdoors, where a biggest problem affecting their work is not thunderstorms, but dust that has accumulated over the years. The dust or other adhesion attached to the solar panel may affect light transmittance of the panel and limit photoelectric efficiency, which will seriously affect efficiency of the panel directly absorbing the sunlight, reduce panel energy absorption and conversion efficiency, and reduce power generation efficiency. Cleaning of conventional solar panels in use can be completed only by manual work. Because of solar panels with larger areas, large power stations use more panels at the same time, dust will be accumulated repeatedly, and repeated cleaning is required. Therefore, labor costs are high, cleaning efficiency is low, and cleaning effect is poor. In many occasions, in order to improve space utilization, solar panels are set in high places by using mounting brackets, which brings more difficulty and risks for cleaning. In order to reduce cleaning costs, many users of the solar panels can only give up the cleaning thereof, and therefore can only be forced to bear the power loss caused by the dust accumulated on the solar panels. Thus, a new, automatic cleaning device is needed for automatically cleaning the solar panels.

Conventional cleaning robots can only be applied to leveled floor surfaces, instead of being applied to sloping planes of the solar panels. Applying the conventional cleaning robots directly to the solar panels has the following issues.

(1) The cleaning robot has insufficient power for moving and cannot move freely, and the cleaning effect thereof is poor. Since the tilt angle of the solar panel is generally from 10 to 40 degrees, the conventional cleaning robot cannot freely move on the sloping plane and will soon run out of power if it is tried to do so.

(2) The cleaning robot may slide and fall down from the solar panel. Because the solar panel is relatively smooth, the weight of the conventional cleaning robot and friction coefficient of the wheels thereof are relatively low, the friction force is relatively small, whereby the robot moves with difficulty and slips down easily.

(3) The cleaning robot cannot follow the prescribed route, moves in a small coverage area, and may fall from an edge of the solar panel. The conventional cleaning robot is generally set to automatically turn away from and bypass obstacles encountered thereby. Because the solar panel does not have any obstacles thereon, the automatically moving cleaning robot can only moving on a single path, whereby its coverage area during movement thereof is small. In addition, the cleaning robot will inevitably fall from the edge of the solar panel. Even with a pre-planned path, existing cleaning robots, during movement thereof, can also easily deviate from the pre-planed path due to gravity and the dust on the panel, making it difficult to ensure straight-line travel. Furthermore, the cleaning robot itself cannot detect and cannot move through the entire panel, which leaves a lot of area to be cleaned.

(4) Recharging the cleaning robot is difficult. Since the solar panel is relatively high and is large in area, it is more difficult to remove the cleaning robot therefrom once the cleaning robot has been sent up. In the prior art, manually removing the cleaning robot from the site or manually removing the battery the cleaning robot and then charging it is necessary, which makes the cleaning robot unable to sustain on-site operations for a long time. Moreover, because many of the solar panels are set high with the mounting brackets, so charging operation of the cleaning robot is very troublesome and wastes a lot of manpower.

(5) Monitoring a working status of the cleaning robot is difficult. As the solar panel may be set high, a staff member on the ground cannot monitor the whole process. Even though the cleaning robot fails, stops to operate or deviates from the route, a staff member is unable to be aware of it in time.

SUMMARY OF INVENTION

An objective of the present invention is to provide a determining method for a robot to move straightly on a sloping plane to solve a technical issue that a deviation of a conventional robot from a predetermined straight path is difficult to detect when the robot moves on a sloping plane.

To solve the above question the present invention provides a determining method for a robot to straightly move on a sloping plane, including steps as follows: step S1) includes building a three-dimensional coordinate on the robot, defining the robot moving direction as a positive Y-axis direction, defining a direction perpendicular to the sloping plane as a Z-axis direction, wherein a plane on which an X-axis and the Y-axis are located paralles the sloping plane; step S2) includes defining the robot moving direction as Ts, while standard sub vectors of gravity acceleration g along three directions of the three-dimensional coordinate are defined as $g_{xs0}$, $g_{ys0}$, $g_{zs0}$; step S3) includes generating a standard direction parameter library; step S4) includes controlling the robot on the sloping plane to move straightly toward any one direction Tm along a predetermined straight path; step S5) includes extracting the standard sub vectors $g_{xm0}$, $g_{ym0}$, $g_{zm0}$ data corresponding to the moving direction Tm from the standard direction parameter library; step S6) includes acquiring a set of real-time direction parameters in real-time at time intervals t, wherein the real-time direction parameters include real-time sub vectors $g_{xm1}$, $g_{ym1}$, $g_{zm1}$ of the gravity acceleration g along three directions of the three-dimensional coordinate; step S7) includes calculating a sub vector difference $g_{xd}=g_{xm1}-g_{xm0}$ between a real-time sub vector of the gravity acceleration g along the X-axis and the standard sub vector; and step S8) includes determining whether the robot moves along the predetermined straight path, wherein when $g_{xd}$ is equal to 0, it is determined that the robot moves along the predetermined straight path, and the method returns to step S6); when $g_{xd}$ is unequal to 0, it is determined that the robot deflects from the predetermined straight path.

Furthermore, steps between the step S6) and the step S7) are further included as follows: step S9) includes utilizing a magnetic sensor to acquire a real-time moving direction Tm1; and step S10) includes comparing the real-time moving direction Tm1 with the moving direction Tm, wherein if the directions are consistent, it is determined that the robot moves along the predetermined straight path, and the method returns to step S6), and wherein if the directions are inconsistent, it is determined that the robot deflects from the predetermined straight path.

Furthermore, the step S3) of generating a standard direction parameter library, includes steps as follows: step S31) includes controlling the robot to implement uniform circular motion on the sloping plane along a predetermined circular path; step S32) includes acquiring and recording at least one set of standard direction parameters in real-time at time intervals $t_0$ during the circular motion of the robot, wherein each set of the standard direction parameters includes a moving direction Ts of the robot and standard sub vectors $g_{xs0}$, $g_{ys0}$, $g_{zs0}$ corresponding to moving direction; and step S33) includes generating a standard direction parameter library according to the at least one set of the standard direction parameters.

Furthermore, in the step S31), an angular velocity of the uniform circular motion is 0.1 to 1.0 degree/second.

Another objective of the present invention is to provide a method for controlling a robot to move straightly on a sloping plane to solve a technical issues that a deviation of a conventional robot from a predetermined straight path when the robot moves on a sloping plane cannot be corrected and that movement of the conventional robot on the sloping plane along a straight path is difficult to guarantee.

To solve the above technical issue, the present invention provides a method for controlling a robot to move straightly on a sloping plane, includes steps as follows: step S11) includes determining whether a robot moves along the predetermined straight path in accordance with the determining method for a robot to move straightly on a sloping plane, wherein if the robot deflects the predetermined straight path, then step S12) is implemented; the step S12) includes controlling the robot to deflect toward the Tm direction during movement thereof; and step S13) includes controlling the robot to move straightly on the sloping plane along the Tm direction, and wherein after step S13) the method returns to step S11).

The step S12) of controlling the robot to deflect toward the Tm direction during movement thereof, further includes steps as follows: step S121) includes extracting an actual moving direction Tn corresponding to the real-time direction parameter in standard direction parameter library; step S122) includes calculating a deflection direction and a deflection angle needed for adjusting the robot, wherein the deflection angle is an included angle between the actual moving direction Tn and the predetermined moving direction Tm; and step S123) includes controlling the robot to deflect left or right by a proportion integration differentiation (PID) method, according to the deflection direction and the deflection angle needed for adjusting the robot.

Advantages of the present invention is that, a determining method and a controlling method for a robot to straightly move on a sloping plane that can monitor a moving direction and a working status of a robot. Once a minor deviation from the moving path occurs, the moving direction of the robot is instantly corrected to drive the robot to move back to the predetermined direction and continue the straight movement. By utilizing the determining method and the controlling method of the present invention, the solar panel cleaning robot can non-repeatedly cover the entire space of the solar panel according to the preset optimized path with high working efficiency.

Figure 1:
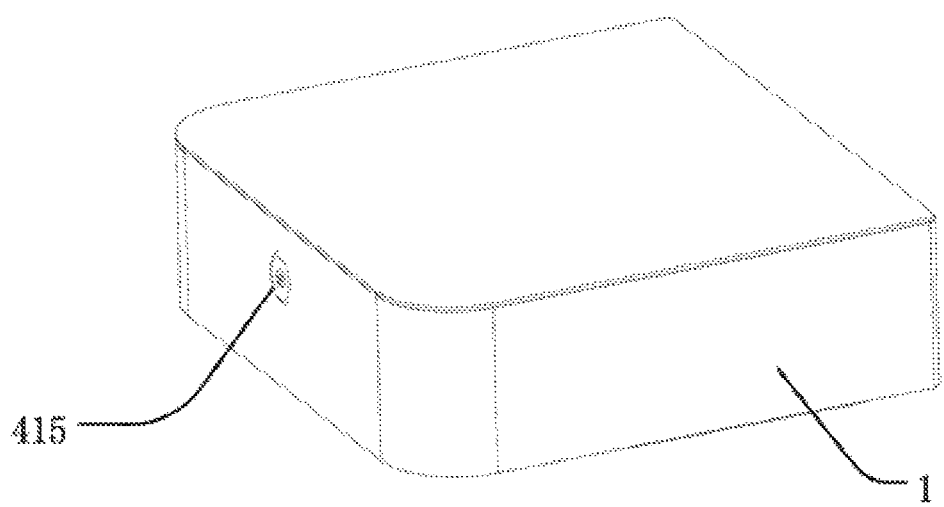
FIG. 1 is a schematic view of an overall appearance of a cleaning robot of an embodiment of the present invention.

The reference numerals in the figures are as follows:
100 solar panel cleaning robot/cleaning robot/robot, 200 solar panel, 300 sloping plane, 400 server;
1 robot body, 2 cleaning device, 3 power system, 4 control system, 5 electric power system; 11 body member;
31 left-front wheel, 32 right-front wheel, 33 left-rear wheel, 34 right-rear wheel, 35, left-drive motor, 36 right-drive motor, 37 track, 38 hub gear;
41 data acquisition unit, 42 processor, 43 storage unit, 44 alarm unit, 45 wireless communication unit; 51 battery box;
311 left-front wheel hub, 312 left-front wheel axis, 321 right-front wheel hub, 322 right-front wheel axis, 331 left-rear wheel hub, 341 right-rear wheel hub;
411 accelerometer sensor, 412 magnetic sensor, 413 distance sensor, 414 counter, 415 image sensor.

DETAILED DESCRIPTION OF PREFERRED EMBODIMENTS

Three preferred embodiments of the present invention will be introduced with reference to appended figures as follows to demonstrate that the present invention may be implemented. The embodiment of the present invention can be fully introduced to those skilled in the art to make technical contents more clear and easy to understand. The present invention can be embodied in many different forms of embodiment, and the scope of protection of the present invention is not limited to the embodiments set forth herein.

In the appended figures, structurally identical components are designated by the same reference numerals, and structurally or functionally similar components throughout are designated by similar numerical reference numerals. The dimensions and thicknesses of each component shown in the figures are arbitrarily shown. The size and thickness of each component are not limited. For the sake of clarity, the thickness of the components is exaggerated somewhat in some places in the figures.

Direction terms mentioned by the present invention, for example "upper", "lower", "front", "rear", "left", "right", "inner", "outer", "side", etc. are merely directions in the appended figures for only explaining and illustrating the present invention but not to limit the protection scope of the present invention.

When some part is described to be "on" another part, the part may be directly disposed on the other part; alternatively, an intervening part may exist, the part is disposed on the intervening part, and the intervening part is disposed on the other part. When a part is described to be "installed on" or "connected to" another part, it may be understood that the parts are directly "installed" or "connected" to each other, alternatively it is understood that one part is indirectly "installed" or "connected" to the other part through an intervening part.

Figure 2:
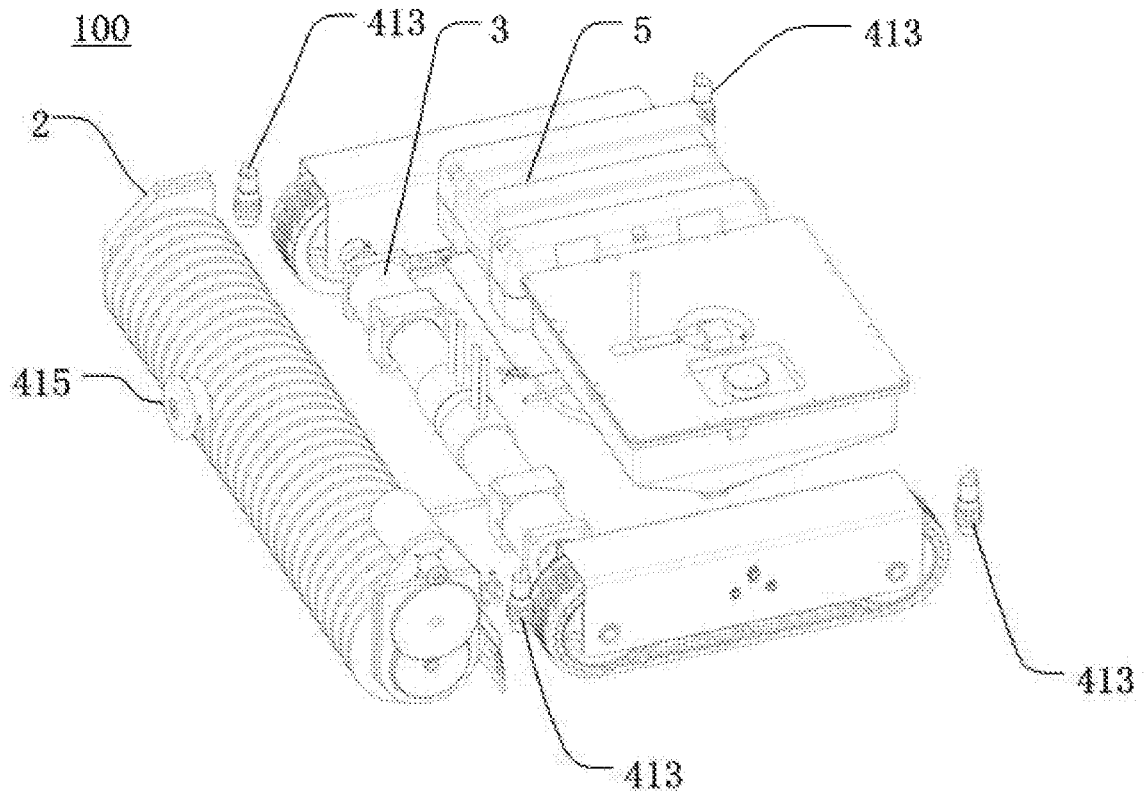
FIG. 2 is a schematic view of an internal structure of the cleaning robot of the embodiment of the present invention.
Figure 3:
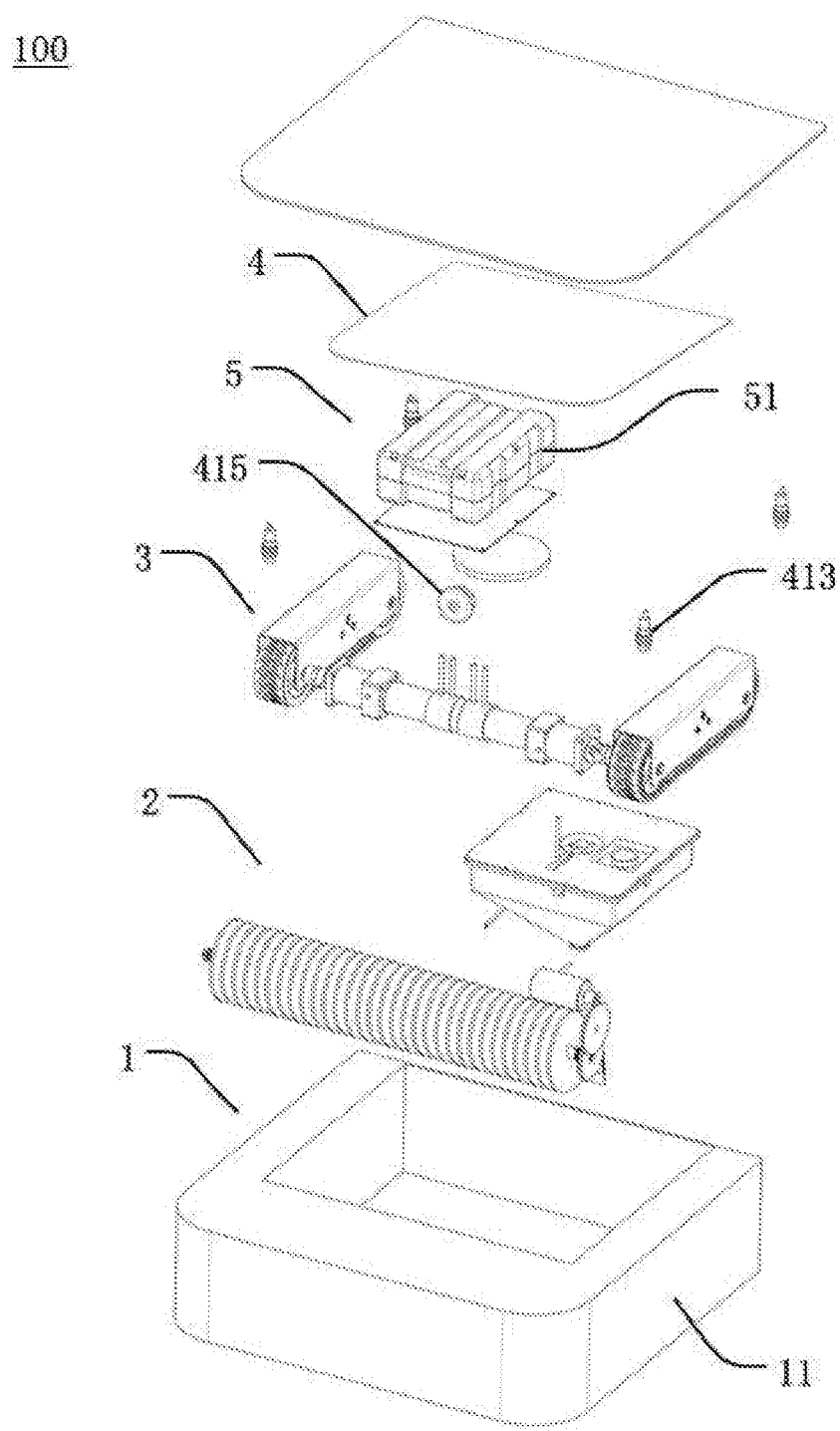
FIG. 3 is schematic view of an exploded structure of the cleaning robot of the embodiment of the present invention.

With reference to FIGS. 1 to 3, the present embodiment provides a solar panel cleaning robot 100 (abbreviated as "cleaning robot" and "robot" hereinafter) includes a robot body 1. The robot body 1 can move on at least one solar panel 200. A cleaning device 2, a power system 3, a control system 4 and an electric power system 5 are disposed on an internal or an external of the robot body 1.

The cleaning device 2 is configured to clean solar panel 200 when the robot body 1 is moving. The power system 3 is configured to adjust a moving direction and a moving speed of the robot body 1 on the solar panel 200, and to control the robot body 1 to move, stop or turn; the control system 4 is connected to the power system 3 and the cleaning device 2, and is configured to transmit various control signals to the power system 3 and the cleaning device 2. The electric power system 5 is connected to the power system 3, the cleaning device 2 and the control system 4, and is configured to provide the power system 3, the cleaning device 2 and the control system 4 with electricity.

During normal work of the solar panel cleaning robot 100 of the present embodiment on the solar panel 200, when the electric power system 5 is switched on, the control system 4 transmits at least one moving-control instruction and at least one cleaning-control instruction, the power system 3 controls the robot body to move along a predetermined path according to the moving-control instruction. In the meantime, the cleaning device 2 switches on the cleaning device 2 according to the cleaning-control instruction to clean the solar panel 200. During movement of the robot body 1, the control system 4 transmits multiple moving control instructions, such as deflection correction instruction, turn instruction and U-turn instruction, etc. to the power system 3 to command the robot body 1 to return to an original path in the case of deflection of straight path, i.e. deflection correction. Alternatively, under a certain condition or a certain place, a turn or U-turn (turning back) is performed such that the robot body 1 is driven to move according to a pre-planned optimized path. Specific navigation methods, deflection correction methods and turn or U-turn (turning back) controlling methods for the robot body will be described in detail below. During the entire moving process, no matter what moving mode the robot body 1 proceeds with, such as straight moving, deflection, deflection correction, turn or U-turn, the cleaning device 2 always remains in working status. When the control system 4, based on certain working parameters (for example, the pre-planned path is finished, or the electric power system 5 has insufficient power), transmits a moving control instruction to stop moving, the robot body 1 stops moving; meanwhile, the control system 4 transmits a cleaning control instruction to switch off the cleaning device 2 to stop cleaning.

Figure 4:
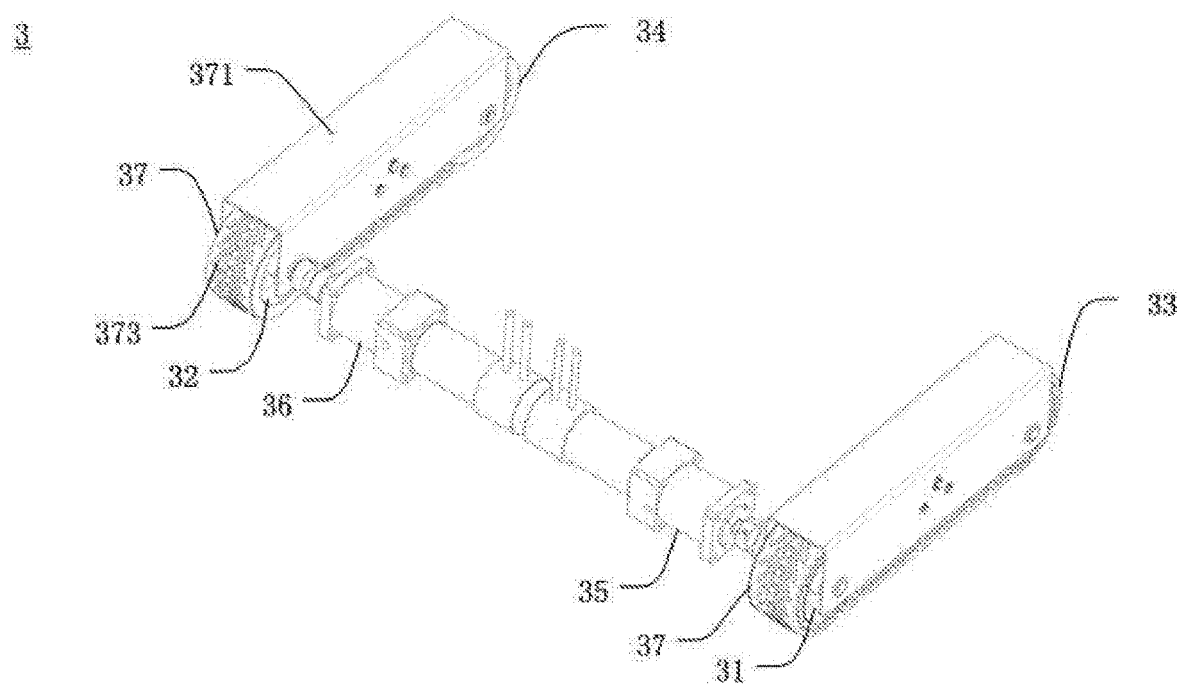
FIG. 4 is an overall structure schematic view of the power system of the embodiment 1 of the present invention.
Figure 5:
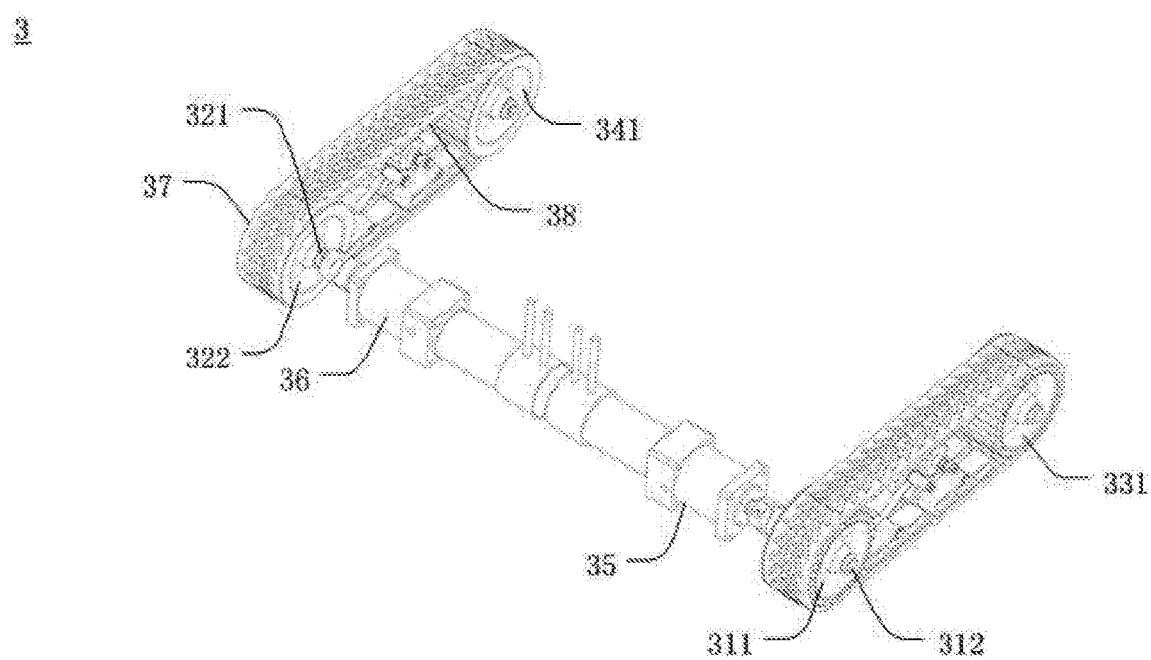
FIG. 5 is a structure schematic view of the power system of the embodiment 1 of the present invention with removal of the track housing.

With reference to FIGS. 4 and 5, in the present embodiment, the power system 3 is disposed on a bottom of the robot body 1, is configured to drive the robot body 1 to move, and includes a front-left wheel 31, a right-front wheel 32, a left-rear wheel 33, a right-rear wheel 34, a left-drive motor 35, a right-drive motor 36, and two tracks 37.

The left-front wheel 31 is installed on a left side of a front portion of a bottom surface of the robot body, and includes a left-front wheel hub 311 and a left-front wheel axis 312. The left-front wheel axis 312 is disposed on a center of the left-front wheel hub 311. The right-front wheel 32 is installed on a right side of the front portion of the bottom surface of the robot body, and includes a right-front wheel hub 321 and a right-front wheel axis 322. The right-front wheel axis 322 is disposed on a center of the right-front wheel hub 321. The left-rear wheel 33 is installed on a left side of a rear portion of the bottom surface of the robot body, and includes a left-rear wheel hub 331 and a left-rear wheel axis 332 (not shown in the figures). The left-rear wheel hub 331 is disposed on a same straight line with the left-front wheel hub 311, and the left-rear wheel axis is disposed on a center of the left-rear wheel hub 331. The right-rear wheel 34 is installed on a right side of the rear portion of the bottom surface of the robot body, and includes a right-rear wheel hub 341 and a right-rear wheel axis (not shown in the figures). The right-rear wheel hub 341 is disposed on a same straight line with the right-front wheel hub 321. The right-rear wheel axis is disposed on a center of the right-rear wheel hub 341. The right-rear wheel axis is directly connected to or connected through a transmission device (not shown in the figures) to the left-rear wheel axis. The left-drive motor 35, the right-drive motor 36 is securely connected to the robot body 1 through a fastening device, is connected to the electric power system 5 through at least one wire, and is connected to the control system 4 through at least one signal line. The left-drive motor 35 is directly connected to or connected through a transmission device (not shown in the figures) to the left-front wheel axis 312. The right-drive motor 36 is directly connected to or connected through a transmission device (not shown in the figures) to the right-front wheel axis 322. Each of the two tracks 37 is a flexible link loop, one of the tracks 37 covers an outer portion of an annular sidewall of the left-front wheel hub 311 and an outer portion of an annular sidewall of the left-rear wheel hub 331; the other the track 37 covers an outer portion of an annular sidewall of the right-front wheel hub 321 and an outer portion of an annular sidewall of the right-rear wheel hub 341. A track housing 371 is disposed on an external of each the track 37 to protect the track and the hub and prevent debris from entering the track or the hub and affecting the normal moving of the robot body 1.

In the present invention, the control system 4 according to a pre-planned optimized path transmits at least one moving control signal to the left-drive motor 35, the right-drive motor 36 such that the left-drive motor 35 and the right-drive motor 36 synchronously adjust rotating speeds and rotational directions of the left-front wheel 31 and the right-front wheel 32 to further adjust the moving direction and moving speed of the robot body 1, which allows the robot body to implement actions such as straight moving, deflection correction, 90 degrees turn, U-turn.

When the robot body is required to move straightly forward, the control system 4 simultaneously transmits a linearly-moving control instruction to the left-drive motor 35 and the right-drive motor 36. The control instruction includes the same motor-rotating speed (for example, rotating speeds of the left-drive motor and right-drive motor are both 60 RPM) and the same rotating direction (for example, the left-drive motor is rotated clockwise, and the right-drive motor is rotated counterclockwise) for the drive motor shaft. Therefore, the left-front wheel 31 and the right-front wheel 32 are driven to synchronously rotate forward. The left-rear wheel 33 and the right-rear wheel 34 are driven wheels, and are driven by the track 37 to synchronously rotate forward with the left-front wheel 31 and the right-front wheel 32 such that the entire robot body 1 moves forward.

When the robot body 1 is required to implement a right deflection, the control system 4 simultaneously transmits a deflection-correction-moving control instruction to the left-drive motor 35 and the right-drive motor 36, and the motor-rotating speed in the control instruction received by the left-drive motor 35 is greater than the motor-rotating speed in the control instruction received by the right-drive motor 36. The difference of the rotating speeds depends on a deflection angle to be adjusted, the less the deflection angle is, the less the rotating speed is. Similarly, when the robot body 1 is required to implement left deflection, the motor-rotating speed in the control instruction received by the left-drive motor 35 is less than the motor-rotating speed in the control instruction received by the right-drive motor 36. When the robot body 1 is back to the original predetermined moving direction, the control system 4 transmits a linearly-moving control instruction again, the rotating speeds of the left-drive motor 35, the right-drive motor 36 become the same once again such that the robot body 1 keeps moving straight forward.

When the robot body is required to implement 90 degrees turn, the control system 4 calculates the rotating speeds and rotating directions of the left-drive motor 35 and the right-drive motor 36 according to a predetermined turning radius. If the turning radius is greater, the rotating directions of the drive motors may be opposite (one is clockwise, the other is counterclockwise), the left-front wheel 31 and the right-front wheel 32 synchronously rotate forward, or one of the wheels is set to stop rotating, to achieve an effect of turn during the moving; If the turning radius is less or on-the-spot turn is performed, the rotating directions of the left-drive motor 35 and the right-drive motor 36 may be designed as the same, both are clockwise or both are counterclockwise. Thus, one of the left-front wheel 31 and the right-front wheel 32 rotates forward, the other rotates backward, one side of the robot body 1 moves forward, and the other side move backward such that small radius turn or on-the-spot turn is performed.

When the robot body is required to implement U-turn (also called "back turn"), the robot body is requested to move to a car lane adjacent to an original car lane after 180 degrees turn. In such case, technical solutions are one-time U-turn and phased U-turn. The control system 4 calculates the rotating speeds and rotating directions of the left-drive motor 35 and the right-drive motor 36 according to the predetermined turning radius. In the solution of one-time U-turn, the turning radius is half a width of the robot body, the front wheel on the inside during the turn stops rotating or rotates forward with an extreme speed (if left U-turn is implemented, the left-front wheel stops rotating; if right U-turn is implemented, the right-front wheel stops rotating), the front wheel on the outside during the turn fast rotates forward to implement left or right U-turn. In the solution of phased U-turn, different solutions may be calculated out according to specific circumstances. The present invention preferably has the following solution: first the robot body 1 is controlled to implement a left on-the-spot turn or right on-the-spot turn of 90 degrees, then the robot body is controlled to move forward for a distance being a width of the body member, and finally the robot body is controlled to implement a left on-the-spot turn or right on-the-spot turn of 90 degrees. Thus, left or right U-turn may be achieved, and the robot body right moves in a car lane adjacent to a former car lane after the U-turn such that the space of the robot of the present invention can achieve non-repeating and dead-space-free effect.

The power system 3 further includes at least one hub gear 38 evenly disposed on surfaces of the outer portions of the annular sidewalls of the left-front wheel hub 311, the left-rear wheel hub 331, the right-front wheel hub 321 and the right-rear wheel hub 341; and at least one track inner tooth 372, evenly disposed on a surface of an inner sidewall of each track 37, the track inner tooth 372 engaged with the hub gear 38 to ensure that when the two front wheels 31, 32 rotate, the track 37 can cooperate with the two hubs to work normally.

Because the solar panel is comparatively smooth with a certain tilt degree, cleaning robot the robot body easily falls off when moving. To solve such issue, with reference to FIG. 4, the power system 3 further includes at least one skid-proof block 373 protruding from an outer sidewall of each the track 37, the skid-proof blocks 373 may be arranged in an ordered array, and are distributed on the entire track 37. The robot body 1 of the present invention utilizes a track structure, and attaches the skid-proof block 373 on the outer sidewall of the track for increasing the friction coefficient, enhancing gripping force, and preventing the robot body 1 from falling off during the moving. Similarly, the track 37 of the present invention may also dispose at least one skid-proof pattern (not shown in the figures) recessed in the outer sidewall of each track and evenly distributed on the entire track, and the effect thereof is the same as that of the skid-proof block.

In the present invention, the technical effect of the power system 3 lies in that utilizing the structures of the track and the skid-proof block allows the robot body of the cleaning robot to be able to freely move on the solar panel without falling off. The left and right-front wheels are driven respectively with two motors to precisely control the moving status of the robot body such that the robot body can more flexibly adjust the moving direction and implement an on-the-spot turn. Therefore, a coverage of the moving path can increase as greater as possible.

Figure 6:
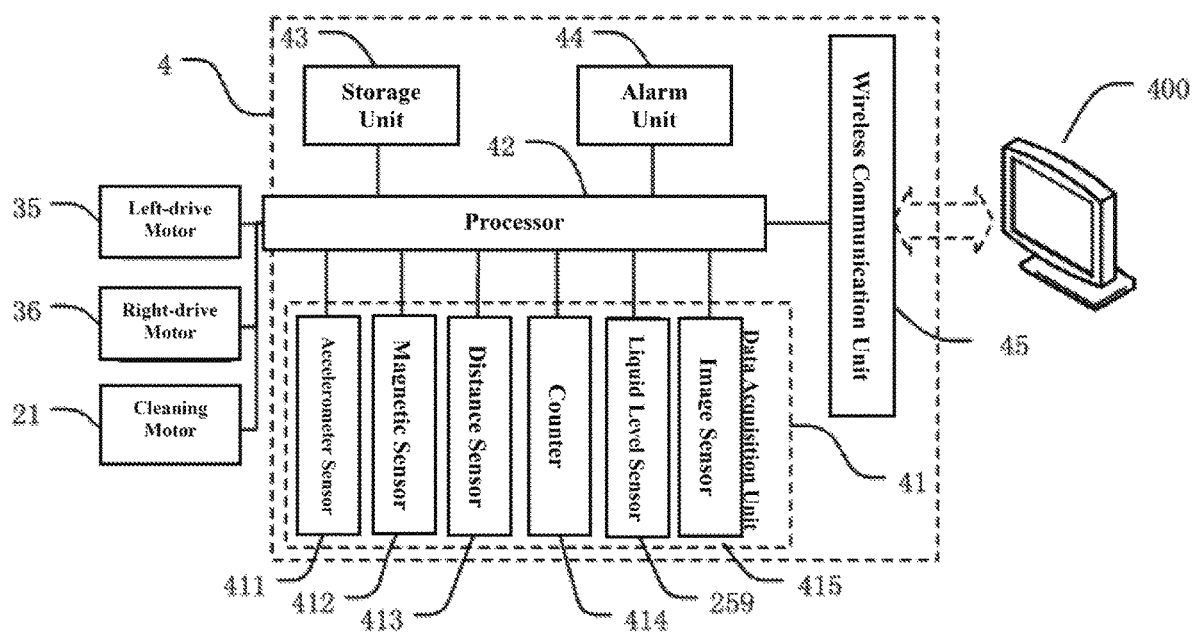
FIG. 6 is a structural block diagram of the control system of the embodiment of the present invention.

With reference to FIG. 6, in the present embodiment, the control system 4 includes a data acquisition unit 41, a processor 42 and at least one storage unit 43. The data acquisition unit 41 includes various sensors, and is configured to acquire at least one working parameters during the moving of the robot body 1. The processor 42 is connected to the data acquisition unit 41, transmits at least one moving control instruction to the power system 3 according to the working parameters, and transmits at least one cleaning control instruction to the cleaning device 2 according to the working parameters. The storage unit 43 is connected to the processor 42, is configured to store working parameters and other pre-calculated or preset parameters during the moving of the robot body 1. The working parameters include real-time acceleration data and real-time moving direction data of the robot body 1, real-time liquid level data of the liquid dispensing container, distance between each distance sensor and the solar panel, images in front of the robot body, etc. Pre-calculated or preset parameters include various working data predetermined by a staff member, such as a pre-calculated and pre-planned cleaning robot moving path (optimized path).

A staff member records a planned optimized path in the control system 4 in advance to provide the robot body of the cleaning robot with path navigation. The control system 4 calculates and plans according to the optimized path, and transmits various of signals of when to switch on, when to switch stop, when to move straight, when to implement left or right 90 degrees turn, when to implement a U-turn to the power system in forms of control instructions to control actions of the moving robot body.

In controlling technologies of the robot body, how to determine whether the robot body moves straight on the sloping plane or not and how to control the robot body to move straightly on the sloping plane are the most basic questions. If the robot body lacks supervision during its moving on a straight line, as the robot body is deflected for some reason (for example, the road is uneven, there are obstacles on the road), the phenomenon of getting more and more deflected will occur. In the present invention, it will result in that the robot deflects from the original navigation path and cannot move through the entire sloping plane in the shortest time. In the present invention, it will result in that after the operation of the cleaning robot is completed, there are still many places on the solar panel remained uncleaned timely.

To solve the technical issue of how to determine whether the robot of the present invention moves straight on the slope, the present invention provides the following solutions.

In the control system 4, the data acquisition unit 41 includes at least one accelerometer sensor 411 configured to acquire acceleration data of the robot 100 (or the robot body 1) in real-time. The accelerometer sensor 411 is connected to the processor 42 and transmits acceleration data of the robot body 1 to the processor 42. The processor 42 analyzes dynamic acceleration data and figures out the force direction and moving direction of the robot body during the moving of the robot body. The processor 42 utilizes the acceleration data of the robot 100 to build a three-dimensional coordinate, decompose the data and calculate to define the moving direction of the robot 100 as a Y-axis direction, and to define a direction perpendicular to the sloping plane as a Z-axis direction. A plane on which a X-axis and the Y-axis are located parallels the sloping plane. According to the vectors of the acceleration data along the X-axis direction, it is determined whether the robot body 1 has left or right deflection. If deflection occurs, the processor transmits at least one direction-adjusting instruction to the power system 3 such that the robot body 1 moves back to its original straight path. If no deflection, the processor 42 determines that the robot body 1 moves straight.

Furthermore, to ensure the accuracy of determination of straight line moving, besides determination by an accelerometer sensor, a magnetic sensor technology can be utilized to make a further determination based on the determination of deflection from the original path by the accelerometer sensor, i.e. a second determination by the magnetic sensor. Thus, in the control system 4, the data acquisition unit 41 may also include a magnetic sensor 412 connected to the processor 42. The magnetic sensor 412 measures physical parameters such as current, location, direction, etc. by sensing intensity of magnetic field. In the present invention, the magnetic sensor 412 is configured to acquire moving direction data in real-time and compare the acquired data with a predetermined standard moving direction based on optimized path data to make determination to ensure whether the robot body moves straight such that the determination of whether the robot body moves straight is more accurate.

To solve the technical issue of how to determine whether the solar panel cleaning robot (abbreviated as "robot" hereinafter) of the present embodiment moves straight, the present embodiment provides a method for determining whether the cleaning robot 100 moves straight on the sloping plane 300, and the method may include steps as follows. Because the solar panel is a sloping plane, therefore the determining method may be utilized to determine whether the solar panel cleaning robot moves straight.

Figure 7:
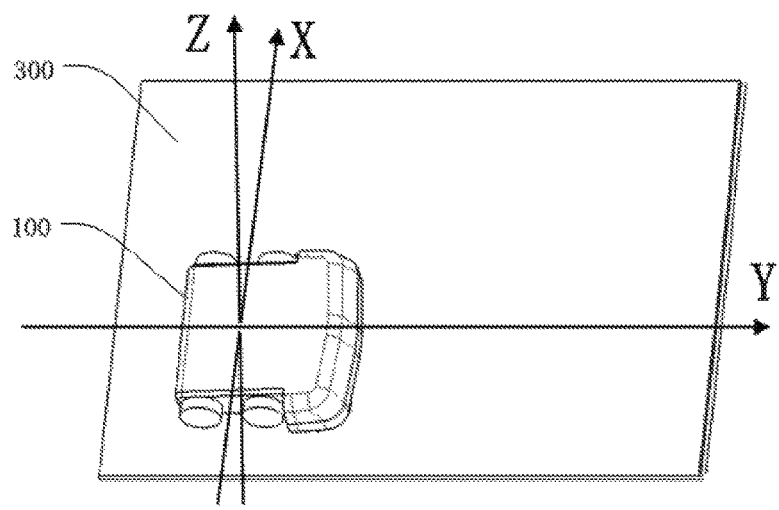
FIG. 7 is a schematic view of a three-dimensional coordinate built on the robot of the embodiment of the present invention.

Step S1), with reference to FIG. 7, includes building a three-dimensional coordinate on the robot, defining the robot moving direction as a positive Y-axis direction, defining a direction perpendicular to the sloping plane as a Z-axis direction, wherein a plane on which the X-axis and the Y-axis are located parallels the sloping plane.

Step S2) includes defining the robot moving direction as Ts, while standard sub vectors of gravity acceleration g along three directions of the three-dimensional coordinate are defined as $g_{xs0}$, $g_{ys0}$, $g_{zs0}$.

Step S3) includes generating a standard direction parameter library, and specifically includes steps as follows: step S31) including controlling the robot to implement uniform circular motion on the sloping plane along a predetermined circular path, wherein an angular velocity of the uniform circular motion is 0.1 to 1.0 degree/second; step S32) including acquiring and recording at least one set of standard direction parameters in real-time at time intervals $t_0$ during the circular motion of the robot, wherein the time interval $t_0$ is 0.1-5.0 second; each set of the standard direction parameters includes a moving direction Ts of the robot and standard sub vectors $g_{xs0}$, $g_{ys0}$, $g_{zs0}$ corresponding to moving direction; and step S33) including, according to the at least one set of the standard direction parameters, generating a standard direction parameter library. In the case of the angular velocity being 0.1 degree/second of and the acquiring time interval $t_0$ being 1 second, about 3600 seconds are required for the robot 100 to finish one uniform circular motion on the sloping plane 300, and the moving direction Ts and the corresponding standard sub vectors $g_{xs0}$, $g_{ys0}$, $g_{zs0}$, of the robot are acquired every 1 second such that 3600 sets of parameters of different directions are obtained and recorded as 3600 sets of standard direction parameters.

Step S4) includes controlling the robot on the sloping plane to move straightly toward any one direction Tm along a predetermined straight path.

Step S5) includes extracting the standard sub vectors $g_{xm0}$, $g_{ym0}$, $g_{zm0}$ data corresponding to the moving direction Tm from the standard direction parameter library.

Step S6) includes acquiring a set of real-time direction parameters in real-time at time intervals t, wherein the real-time direction parameters include real-time sub vectors $g_{xm1}$, $g_{ym1}$, $g_{zm1}$ of the gravity acceleration g along three directions of the three-dimensional coordinate, and the time interval t is 0.1-1.0 second.

Step S7) includes calculating a sub vector difference $g_{xd}=g_{xm1}-g_{xm0}$ between a real-time sub vector of the gravity acceleration g along the X-axis and the standard sub vector.

step S8) includes determining whether the robot moves along the predetermined straight path, wherein when $g_{xd}$ is equal to 0, it is determined that the robot moves along the predetermined straight path, and the method returns to step S6); when $g_{xd}$ is unequal to 0, it is determined that the robot deflects from the predetermined straight path.

Because the gravity acceleration g of the robot 100 on the sloping plane 300 is a constant, when the robot 100 operates on the sloping plane 300, the moving direction Ts and acceleration sub vector data $g_{xs}$, $g_{ys}$, $g_{zs}$ along the direction should conform to the standard direction parameters in the standard data library. In the present embodiment, determining whether the robot moves straight line is essentially determining whether the robot moves slightly left or right with respect to a straight path. Therefore, it is only needed to determine whether the real-time sub vector of the gravity acceleration g along the X-axis direction is the same as the standard sub vector. If the same, no deflection exists, if difference, deflection occurs. Furthermore, it may be determined whether the deflection is left or right according to whether the sub vector difference $g_{xd}=g_{xm1}-g_{xm0}$ is positive or negative.

Furthermore, the present embodiment also provides another method for determining whether the robot moves straight on the sloping plane, after the above step S8) determines that the robot deflects from the predetermined straight path, steps may be further included as follows: step S9) including utilizing a magnetic sensor to acquire a real-time moving direction Tm1; step S10) including comparing the real-time moving direction Tm1 with the moving direction Tm, wherein if the directions are consistent, it is determined that the robot moves along the predetermined straight path, and the method returns to step S6), wherein if the directions are inconsistent, it is determined that the robot deflects from the predetermined straight path. Under the circumstance of a former determination indicating deflection of the robot from the straight path, a second determination is implemented to prevent accident, which makes the determination result more precise.

After the control system 4 finds out the moving path of the robot is deflected, the deflection must be corrected immediately suck that the robot can move back to its original path. Such process may be called deflection correction process. To solve the technical issue of how to control the robot to move straightly on the sloping plane, the present embodiment provides a method for controlling the robot to move straightly on the sloping plane, and the method may include steps as follows:

Step S11) includes determining whether a robot moves along the predetermined straight path according to the above method of the steps S1)-S8) or steps S1)-S10) for determining the robot moving straight on the sloping plane, wherein if the robot deflects the predetermined straight path, then step S12) is implemented.

Step S12) includes controlling the robot to deflect toward the Tm direction during movement thereof, wherein the step specifically includes steps as follows: step S121) including extracting an actual moving direction Tn corresponding to the real-time direction parameter in standard direction parameter library; step S122) including calculating a deflection direction and a deflection angle needed for adjusting the robot, wherein the deflection angle is an included angle between the actual moving direction Tn and the predetermined moving direction Tm; step S123) including transmitting a direction-adjusting instruction to the power system 3 to control the robot to deflect left or right, according to the deflection direction and the deflection angle needed for adjusting the robot.

Step S13) includes controlling the robot to move straightly on the sloping plane along the Tm direction, and wherein after step S13) the method returns to step S11).

The method for determining whether the robot moves straight on the sloping plane, as steps S1) to S8), or steps S1) to S10), can quickly determine whether the robot body moves straight on the slope according to a set of acceleration data (and magnetic sensor data) in a very short time. Because the accelerometer sensor can acquire data in real-time, and acquires a set of data every time interval, therefore the above determination process is implemented every time interval regularly. Whenever a robot (robot body) is found deflecting from a straight path on a sloping plane, it can be determined that the robot deflects at this time.

The method for controlling the robot to move straightly on sloping plane, as step S11) to step S13), is based on the above technology for determining whether the robot moves straight on the sloping plane. When deflection of the robot is ascertained, the moving direction of the robot is immediately adjusted to make it return to the original path.

In the present invention, the method for determining whether the robot moves straight on the sloping plane and the method for controlling the robot to move straightly on the sloping plane are used in conjunction with each other to ensure that the cleaning robot does not deflect during the straight moving such that the cleaning robot can be assured to be able to move through the entire solar panel in the shortest time along the preset optimized navigation path and to clean the entire solar panel fast and well.

According to the principles of the shortest time and the shortest moving path, an optimized navigation path of the robot on a rectangular slope can be easily planned and figured out. Regarding how to make the robot able to move along a preset optimized navigation path, the present invention provides a series of controlling solutions and navigation methods. The navigation method is the controlling method that makes the robot move along the navigation path.

In the present invention, the data acquisition unit 41 may also include at least one distance sensor 413 including but not limited to an ultra sound sensor and an optical pulse sensor. The distance sensor 413 is disposed on an outer edge of the robot 100 (the robot body 1), and specifically can be disposed respectively on four corners of the robot body 1 (body member 11). With reference to FIG. 2, when the robot 100 moves on a rectangular slope, a front end of the distance sensor 413 faces the rectangular slope. The distance sensor 413 is connected to the processor 42 and is configured to acquire distance data of the distance sensor 413 and the rectangular slope in real-time. The processor 42 determines whether the robot body 1 is located on an edge of a corner of the rectangular slope according to the distance data of the distance sensor 413 and the rectangular slope.

In the present invention, a number of the distance sensor 413 is four, and the four distance sensors 413 are disposed respectively one four corners of the robot (the robot body). When only two of the distance sensors 413 are able to acquire the distance data, the processor 42 determines that the robot (the robot body) is located on an edge of a rectangular slope 300, and transmits at least one turning instruction (U-turn) to the power system 3. When only one of the distance sensors 413 acquires the distance data, the processor 42 determines that the robot (the robot body) is located on a certain corner of the rectangular slope 300, and transmits at least one turning instruction (90 degrees turn or U-turn) to the power system 3. The four distance sensors 413 may also be disposed respectively on middle portions of four sides of the robot body 1. When finding that the distance sensor 413 on one side is unable to acquire distance data, the processor 42 may determine that the side is located on the edge of the rectangular slope. If two adjacent sides are both located on the edge of the rectangular slope, it may be determined that the robot body 1 is located on a certain corner of the solar panel 200. The number of the distance sensor 413 may be eight, and the eight distance sensors 413 are disposed respectively on the four corners of the robot body 1 or on the middle portions of the four sides of the robot body 1.

The control system 4 may further include a counter 414 configured to calculate corners through which the robot body 1 passes during the moving on the sloping plane. In a work of the robot, whenever the processor 42 determines that the robot body reaches a certain corner, a variable "1" is added to the counter. The processor 42, through a technical result feedbacked by the counter 414, can explicitly know an order of the corners that the robot body 1 reaches (a certain corner).

A staff member records a planned optimized path in a storage member of the control system 4 in advance. The processor transmits control instructions including start, stop, straight moving, left or right 90 degrees turn, left or right U-turn (180 degrees turn to an adjacent car lane) to the power system 3 according to the navigation path and the real-time location of the robot (robot body) to control the robot body to move based on the navigation path during the moving.

The present embodiment discloses four path navigation methods for robot moving on the rectangular slope, and details will be shown below. The solar panel is also a rectangular slope, the path navigation method for the cleaning robot to move the solar panel is also applied to the path navigation method for the robot to move on the rectangular slope below.

A first embodiment of path navigation method for the robot to move on a rectangular slope, disclosed in the present embodiment, includes steps as follows: step S101) including setting a left-lower corner of the rectangular slope as a navigation starting point; step S102) including controlling the robot to move straightly from the navigation starting point to a left-upper corner of the rectangular slope; step S103) including detecting in real-time whether the robot reaches a first corner of the rectangular slope, wherein if the robot does not reach the first corner, and the method returns to step S102), wherein if the robot reaches the first corner, controlling the robot to turn right 90 degrees is implemented; step S104) including controlling the robot to move straight; step S105) including detecting in real-time whether the robot reaches a second corner of the rectangular slope; if the robot does not reach the second corner, the method returns to step S104), wherein if the robot reaches the second corner, controlling the robot to implement a right U-turn is implemented; step S106) including detecting in real-time whether the robot reaches a third corner of the rectangular slope, wherein if the robot does not reach the third corner, controlling the robot to move straightly is implemented, wherein if the robot reaches the third corner, controlling the robot to move straightly is implemented, and detecting in real-time whether the robot reaches a fourth corner of the rectangular slope is implemented, wherein if the robot does not reach the fourth corner, controlling the robot to move straightly is implemented, wherein if the robot reaches the fourth corner, controlling the robot to stop moving is implemented; step S107) including detecting in real-time whether the robot reaches an edge of the rectangular slope, wherein if the robot reaches the edge of the rectangular slope, controlling the robot to implement a left U-turn is implemented; step S108) including detecting in real-time whether the robot reaches the third corner of the rectangular slope, wherein if the robot does not reach the third corner, controlling the robot to move straightly is implemented, wherein if the robot reaches the third corner, detecting in real-time whether the robot reaches the fourth corner of the rectangular slope, wherein if the robot does not reach the fourth corner, controlling the robot to move straightly is implemented, wherein if the robot reaches the fourth corner, controlling the robot to stop moving is implemented; step S109) including detecting in real-time whether the robot reaches the edge of the rectangular slope, wherein if the robot reaches the edge of the rectangular slope, controlling the robot to implement a right U-turn is implemented; and the method returns to step S106).

Figure 8:
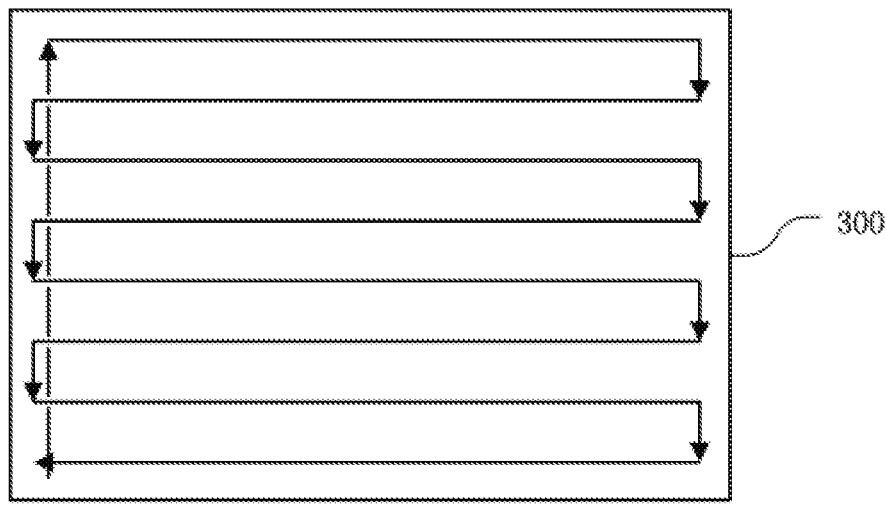
FIG. 8 is a moving path schematic view of the robot utilizing a first embodiment of a path navigation method to move on the rectangular slope.
Figure 9:
FIG. 9 is another moving path schematic view of the robot utilizing the first embodiment of the path navigation method to move the rectangular slope.
Figure 10:
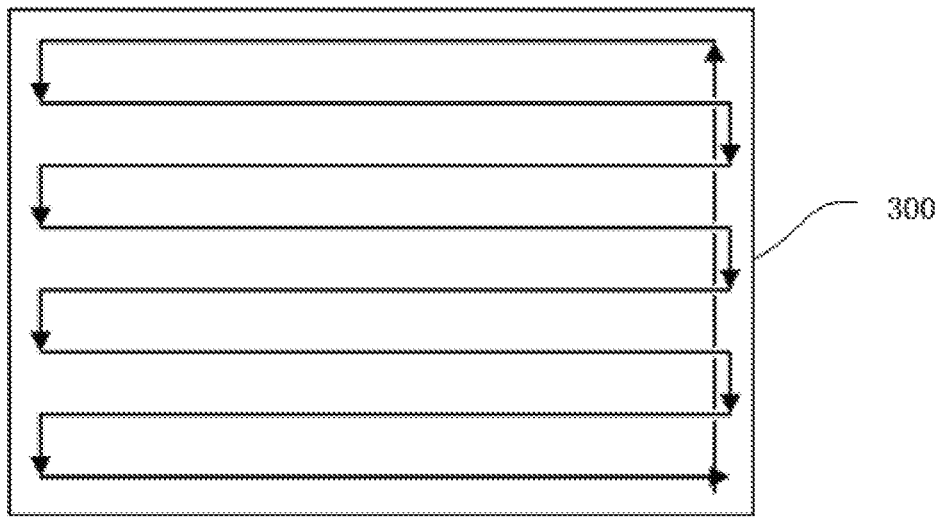
FIG. 10 is a moving path schematic view of the robot utilizing a second embodiment of the path navigation method to move on the rectangular slope.
Figure 11:
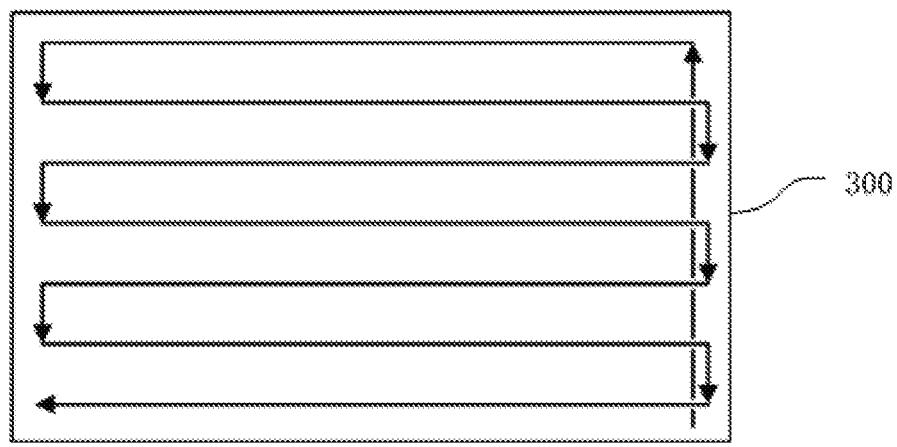
FIG. 11 is another moving path schematic view of the robot utilizing the second embodiment of the path navigation method to move on the rectangular slope.

There may be various moving paths of the robot utilizing the first embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 8 and 9, two possible moving paths along which the robot 100 moves on the rectangular slope 300 by using the first embodiment of the path navigation method are shown.

A second embodiment of the path navigation method for the robot to move on the rectangular slope, disclosed in the present embodiment, includes steps as follows: step S201) includes setting the right-lower corner of the rectangular slope as a navigation starting point; step S202) includes controlling the robot to move straightly from the navigation starting point to the right-upper corner of the rectangular slope; step S203) includes detecting in real-time whether the robot reaches the first corner of the rectangular slope, wherein if the robot does not reach the first corner, the method returns to step S202), wherein if the robot reaches the first corner, controlling the robot to turn left 90 degrees is implemented; step S204) includes controlling the robot to move straight; step S205) includes detecting in real-time whether the robot reaches the second corner of the rectangular slope, wherein if the robot does not reach the second corner, the method returns to step S204), wherein if the robot reaches the second corner, controlling the robot to implement a left U-turn is implemented; step S206) includes detecting in real-time whether the robot reaches the third corner of the rectangular slope, wherein if the robot does not reach the third corner, controlling the robot to move straightly is implemented; if the robot reaches the third corner, controlling the robot to move straightly is implemented, and detecting in real-time whether the robot reaches the fourth corner of the rectangular slope is implemented, wherein if the robot does not reach the fourth corner, controlling the robot to move straightly is implemented, wherein if the robot reaches the fourth corner, controlling the robot to stop moving is implemented; step S209) includes detecting in real-time whether the robot reaches the edge of the rectangular slope, wherein if the robot reaches the edge of the rectangular slope, controlling the robot to implement a right U-turn is implemented; and the and returns to step S206).

There may be various moving paths of the robot utilizing the second embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 25 and 26, two possible moving paths along which the robot 100 moves on the rectangular slope 300 by using the second embodiment of the path navigation method are shown.

A third embodiment of the path navigation method for the robot to move on the rectangular slope, disclosed in the present embodiment, includes steps as follows: step S301) includes setting the left-lower corner of the rectangular slope as a navigation starting point; step S302) includes controlling the robot to move straightly from the navigation starting point to the left-upper corner of the rectangular slope; step S303) including detecting in real-time whether the robot reaches the first corner of the rectangular slope, wherein if the robot does not reach the first corner, the method returns to step S302), wherein if the robot reaches the first corner, controlling the robot to implement a right U-turn is implemented; step S304) includes detecting in real-time whether the robot reaches the second corner of the rectangular slope, wherein if the robot does not reach the second corner, controlling the robot to move straightly is implemented, wherein if the robot reaches the second corner, controlling the robot to move straightly is implemented, and detecting in real-time whether the robot reaches the third corner of the rectangular slope is implemented; if the robot does not reach the third corner, controlling the robot to move straightly is implemented, wherein if the robot reaches the third corner, controlling the robot to stop moving is implemented; step S305) includes detecting in real-time whether the robot reaches the edge of the rectangular slope, wherein if the robot reaches the edge of the rectangular slope, controlling the robot to implement a left U-turn is implemented; step S306) includes detecting in real-time whether the robot reaches the second corner of the rectangular slope, wherein if the robot does not reach the second corner, controlling the robot to move straightly is implemented; if the robot reaches the second corner, controlling the robot to move straightly is implemented, and detecting in real-time whether the robot reaches the third corner of the rectangular slope is implemented, wherein if the robot does not reach the third corner, controlling the robot to move straightly is implemented, wherein if the robot reaches the third corner, controlling the robot to stop moving is implemented; step S307) includes detecting in real-time whether the robot reaches the edge of the rectangular slope, wherein if the robot reaches the edge of the rectangular slope, controlling the robot to implement a right U-turn is implemented; and the method returns to step S304).

Figure 12:
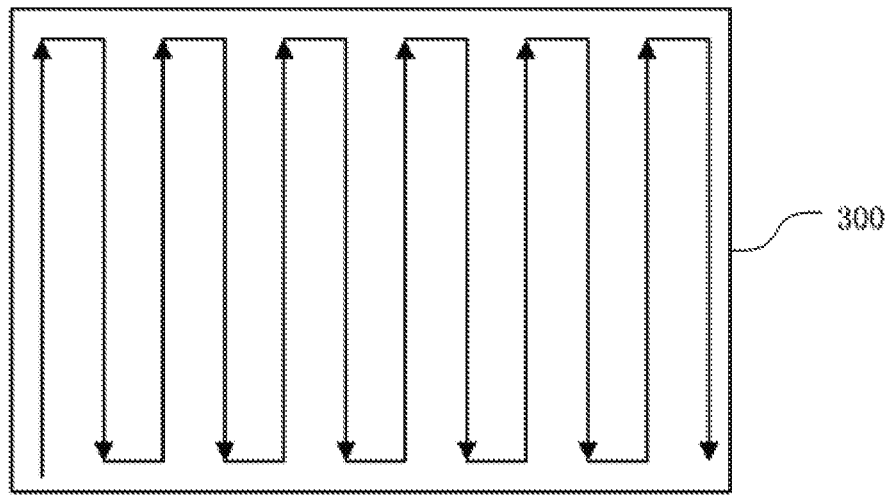
FIG. 12 is a moving path schematic view of the robot utilizing a third embodiment of the path navigation method to move on the rectangular slope.
Figure 13:
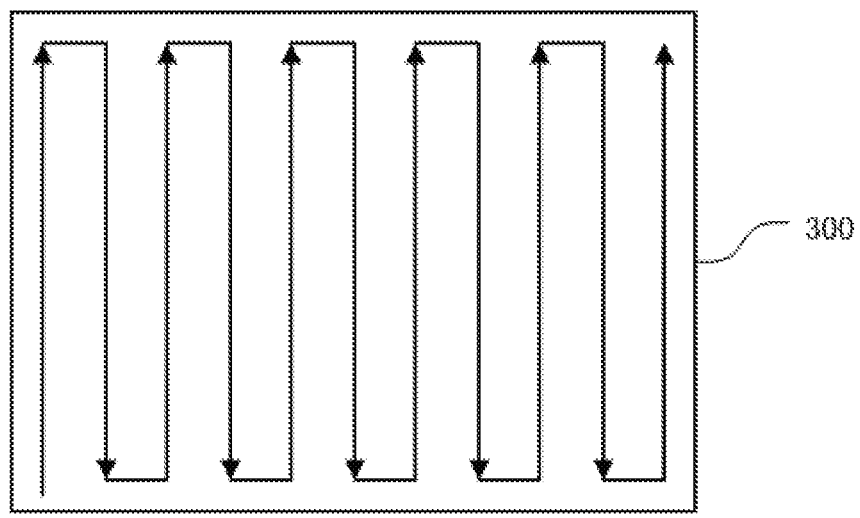
FIG. 13 is another moving path schematic view of the robot utilizing the third embodiment of the path navigation method to move on the rectangular slope.

There may be various moving paths of the robot utilizing the third embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 12 and 13, two possible moving paths along which the robot 100 moves on the rectangular slope 300 by using the third embodiment of the path navigation method are shown.

A fourth embodiment of the path navigation method for the robot to move on the rectangular slope, disclosed in the present embodiment, includes steps as follows: step S401) includes setting the right-lower corner of the rectangular slope as a navigation starting point; step S402) includes controlling the robot to move straightly from the navigation starting point to the right-upper corner of the rectangular slope; step S403) includes detecting in real-time whether the robot reaches the first corner of the rectangular slope, wherein if the robot does not reach the first corner, the method returns to step S402), wherein if the robot reaches the first corner, controlling the robot to implement a left U-turn is implemented; step S404) includes detecting in real-time whether the robot reaches the second corner of the rectangular slope, wherein if the robot does not reach the second corner, controlling the robot to move straightly is implemented, wherein if the robot reaches the second corner, controlling the robot to move straightly is implemented, and detecting in real-time whether the robot reaches the third corner of the rectangular slope is implemented, wherein if the robot does not reach the third corner, controlling the robot to move straightly is implemented, wherein if the robot reaches the third corner, controlling the robot to stop moving is implemented; step S405) includes detecting in real-time whether the robot reaches the edge of the rectangular slope, wherein if the robot reaches the edge of the rectangular slope, controlling the robot to implement a right U-turn is implemented; step S406) includes detecting in real-time whether the robot reaches the second corner of the rectangular slope, wherein if the robot does not reach the second corner, controlling the robot to move straightly is implemented, wherein if the robot reaches the second corner, controlling the robot to move straightly is implemented, and detecting in real-time whether the robot reaches the third corner of the rectangular slope is implemented, wherein if the robot does not reach the third corner, controlling the robot to move straightly is implemented, wherein if the robot reaches the third corner, controlling the robot to stop moving is implemented; step S407) includes detecting in real-time whether the robot reaches the edge of the rectangular slope, wherein if the robot reaches the edge of the rectangular slope, controlling the robot to implement a left U-turn is implemented; and the method returns to step S404).

Figure 14:
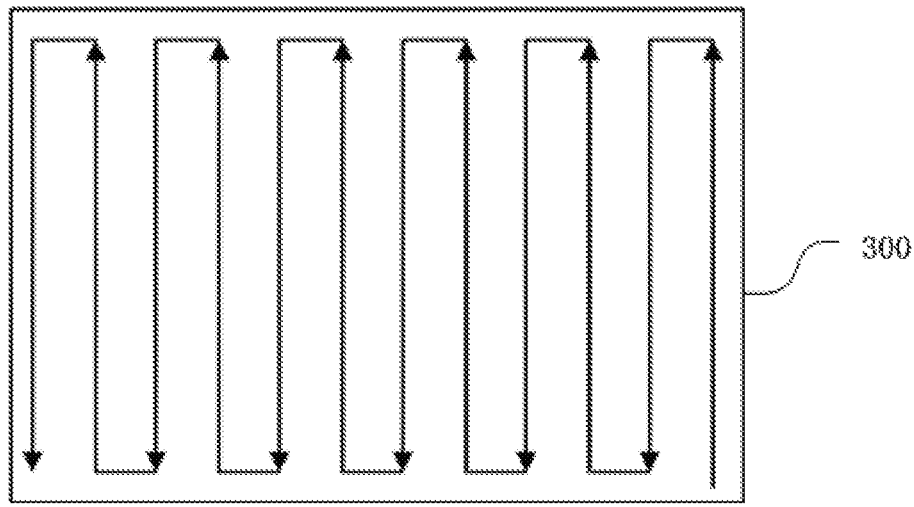
FIG. 14 is a moving path schematic view of the robot utilizing a fourth embodiment of the path navigation method to move on the rectangular slope.
Figure 15:
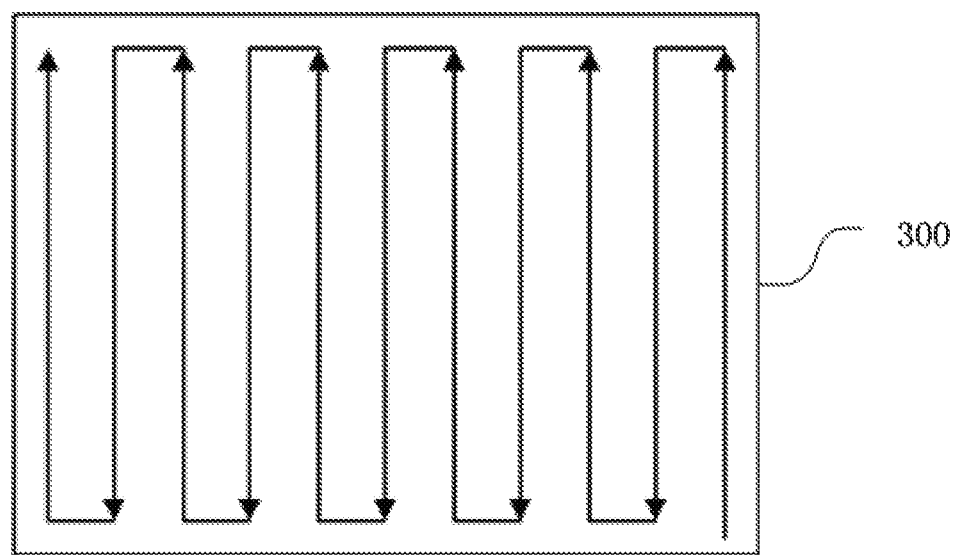
FIG. 15 is a moving path schematic view of the robot utilizing the fourth embodiment of the path navigation method to move on the rectangular slope.

There may be various moving paths of the robot utilizing the fourth embodiment of the path navigation method on the rectangular slope. Because a ratio of the length and width of each rectangular slope and that of the length and width of each robot are different, therefore moving paths of robots are different, and the locations on which the robots stop are different (stop at the left-lower corner or the right-lower corner). With reference to FIGS. 14 and 15, two possible moving paths along which the robot 100 moves on the rectangular slope 300 by using the fourth embodiment of the path navigation method are shown.

In the above four path navigation methods for the robot to move on the rectangular slope, specific ways of determining whether the robot moves straight, or controlling the robot to move straightly has been described above, and will not be given here. Controlling the robot to turn left or right 90 degrees, has been described in the above introduction of the power system, and will not be given here.

In the above four path navigation methods for the robot to move on the rectangular slope, detecting in real-time whether the robot reaches a corner or an edge of the rectangular slope, specifically includes steps as follows: step S1011) includes disposing distance sensors 413 respectively on a left-front portion, a right-front portion, a left-rear portion and a right-rear portion of the robot, wherein the distance sensors 413 extend to the external of the robot, and the distance sensors 413 face the solar panel 200; step S1012) includes by sequentially utilizing four numerals for the distance sensors 413, defining the distance sensor 413 of the left-front portion, right-front portion, left-rear portion and right-rear portion of the robot respectively as a sensor N1, a sensor N2, a sensor N3 and a sensor N4; step S1013) includes determining a location of the robot the robot according to sensor signals simultaneously acquired by the robot at any one time; when the robot simultaneously acquires a signal of the sensor N3 and a signal of the sensor N4, it is determined that the robot reaches the edge of the rectangular slope; when the robot can only acquire a signal of the sensor N4 signal, it is determined that the robot reaches the first corner or second corner of the rectangular slope; when the robot can only acquire a signal of the sensor N3 signal, it is determined that the robot reaches the third corner or fourth corner of the rectangular slope; step S1014) includes reading a counting result of the counter to determine an order of the corner (which one of the corner) when it is determined that the robot reaches a corner of the rectangular slope.

In the above four path navigation methods for the robot to move on the rectangular slope, controlling the robot to implement a left U-turn, specifically includes steps as follows: step S1031) includes controlling the robot to implement a left on-the-spot turn 90 degrees; step S1032) includes controlling the robot to move straightly for a certain distance, the certain distance is equal to a width of the robot; and step S1033) includes controlling the robot to implement a left on-the-spot turn 90 degrees.

In the above four path navigation methods for the robot to move on the rectangular slope, controlling the robot to implement a right U-turn, specifically includes steps as follows: step S1041) includes controlling the robot to implement a right on-the-spot turn 90 degrees; step S1042) includes controlling the robot to move straightly for a certain distance, the certain distance is equal to the width of the robot; step S1043) includes controlling the robot to implement a right on-the-spot turn degrees.

The technical effect of the above four path navigation methods for the robot to move on the rectangular slope is that the robot is allowed to move through each corner of the rectangular slope by the shortest path in the shortest time, which achieves full coverage to the rectangular slope. In the present embodiment. The cleaning robot can utilize any one of the above four path navigation methods to move through each corner of the solar panel in a short time and effectively clean the solar panel. Because sewage is generated during the cleaning process and may fall off along the solar panel, therefore cleaning effects of the third embodiment and the fourth embodiment of the path navigation method are probably not so good, and the first embodiment and the second embodiment of the path navigation method are preferable.

The control system 4 further includes at least one alarm unit 44 connected to the processor 42. The alarm unit 44 may be a red light or a buzzer disposed on the external of the robot body. When a certain working parameter exceeds the predetermined threshold value, the alarm unit transmits an alarming signal. For example, when the liquid level of the liquid dispensing container 25 is lower than a certain predetermined threshold value, or when the electric power system 5 has insufficient electric power, or when the cleaning robot transmits a malfunction signal, the alarm unit 44 may transmit an alarming signal to warn a user.

The data acquisition unit 41 includes at least one image sensor 415 or camera connected to the processor 42, disposed on the front end of the robot body 1 (with reference to FIGS. 2 and 3) and configured to acquire images in front of the robot body 1 during the moving of the robot body 1. These images can be stored in the storage unit for a staff member to check the working status of robot.

In the present invention, technical effect of the control system 4 is providing various methods for the cleaning robot to move along an optimized path on the solar panel and methods for controlling the robot to move straightly on the sloping plane to ensure the robot to non-repeatedly move through the entire space of the solar panel with large coverage area without the robot falling out from an edge of the solar panel, which assures both the cleaning effect and working efficiency.

The solar panel cleaning robot 100 may also include at least one wireless communication unit 45 wirelessly connected to a server 400, and configured to build communication between the solar panel cleaning robot 100 and server 400. Images in front of the robot body 1 can be transmitted to the server 400 in real-time such that a staff member may efficiently implement monitoring during the working progress of the cleaning robot, which solves the technical issue that monitoring the clean robot on the conventional solar panel becomes difficult when the solar panel is high.

In the present invention, with reference to FIG. 3, the electric power system 5 is one or a set of disposable batteries or rechargeable batteries (not shown in the figures) disposed in the battery box 51. A staff member needs to regularly remove the cleaning robot from the solar panel and replace or charge the battery therein to allow the clean robot to continue to work.

The embodiment provides a solar panel cleaning robot that may freely move on the solar panel and effectively remove the dust on the panel and other attachments, and decontamination effect thereof is excellent. During operation of the cleaning robot of the present invention on the solar panel, the cleaning robot can non-repeatedly cover the entire space of the solar panel according to the preset optimized path with high working efficiency. The cleaning robot of the present invention can automatically turn or back turn according to the program to achieve automatic control and is easy to operate.

The above is only the preferred embodiment of the present invention. It should be noted that those skilled in the art, without departing from the principle of the present invention, can also make some improvements and modifications, these improvements and modifications should be deemed as the protection scope of the present invention.

What is claimed is:

1. A method for determining a robot to move straightly on a sloping plane, comprising:

step S1) comprising building a three-dimensional coordinate on the robot, defining the robot moving direction as a positive Y-axis direction, defining a direction perpendicular to the sloping plane as a Z-axis direction, wherein a plane on which an X-axis and the Y-axis are located parallels the sloping plane;

step S2) comprising defining the robot moving direction as Ts, while standard sub vectors of gravity acceleration g along three directions of the three-dimensional coordinate are defined as $g_{xs0}$, $g_{ys0}$, $g_{zs0}$;

step S3) comprising generating a standard direction parameter library;

step S4) comprising controlling the robot on the sloping plane to move straightly toward any one direction Tm along a predetermined straight path;

step S5) comprising extracting the standard sub vectors $g_{xm0}$, $g_{ym0}$, $g_{zm0}$ data corresponding to the moving direction Tm from the standard direction parameter library;

step S6) comprising acquiring a set of real-time direction parameters in real-time at time intervals t, wherein the real-time direction parameters comprise real-time sub vectors $g_{xm1}$, $g_{ym1}$, $g_{zm1}$ of the gravity acceleration g along three directions of the three-dimensional coordinate;

step S7) comprising calculating a sub vector difference $g_{xd}=g_{xm1}-g_{xm0}$ between a real-time sub vector of the gravity acceleration g along the X-axis and the standard sub vector; and step S8) comprising determining whether the robot moves along the predetermined straight path, wherein when $g_{xd}$ is equal to 0, it is determined that the robot moves along the predetermined straight path, and the method returns to step S6); when $g_{xd}$ is unequal to 0, it is determined that the robot deflects from the predetermined straight path.

2. The method for determining a robot to move straightly on a sloping plane as claimed in claim 1, wherein the step S3) of generating a standard direction parameter library comprises:

step S31) comprising controlling the robot to implement uniform circular motion on the sloping plane along a predetermined circular path;

step S32) comprising acquiring and recording at least one set of standard direction parameters in real-time at time intervals $t_0$ during the circular motion of the robot, wherein each set of the standard direction parameters includes a moving direction Ts of the robot and standard sub vectors $g_{xs0}$, $g_{ys0}$, $g_{zs0}$ corresponding to moving direction; and step S33) comprising generating a standard direction parameter library according to the at least one set of the standard direction parameters.

3. The method for determining a robot to move straightly on a sloping plane as claimed in claim 2, wherein in the step S31), an angular velocity of the uniform circular motion is 0.1 to 1.0 degree/second.

4. The method for determining a robot to move straightly on a sloping plane as claimed in claim 3, wherein in the step S32), the time interval t0 is 0.1-1.0 second.

5. The method for determining a robot to move straightly on a sloping plane as claimed in claim 1, wherein in the step S6), the time interval t is 0.1-1.0 second.

6. The method for determining a robot to move straightly on a sloping plane as claimed in claim 1, after the step S8), further comprising:

step S9) comprising acquiring a real-time moving direction Tm1 by utilizing a magnetic sensor; and step S10) comprising comparing the real-time moving direction Tm1 with the moving direction Tm, wherein if the directions are consistent, it is determined that the robot moves along the predetermined straight path, and the method returns to step S6), wherein if the directions are inconsistent, it is determined that the robot deflects from the predetermined straight path.

7. A method for controlling a robot to move straightly on a sloping plane, comprising:

step S11) comprising determining whether a robot moves along the predetermined straight path according to the method for determining a robot to move straightly on a sloping plane as claimed in claim 1, wherein if the robot deflects the predetermined straight path, then step S12) is implemented;

the step S12) comprising controlling the robot to deflect toward the Tm direction during movement thereof; and step S13) comprising controlling the robot to move straightly on the sloping plane along the Tm direction, and wherein after step S13) the method returns to step S11).

8. The method for controlling a robot to move straightly on a sloping plane as claimed in claim 7, wherein the step S12) of controlling the robot to deflect toward the Tm direction during movement thereof, further comprises:

step S121) comprising extracting an actual moving direction Tn corresponding to the real-time direction parameter in standard direction parameter library;

step S122) comprising calculating a deflection direction and a deflection angle needed for adjusting the robot, wherein the deflection angle is an included angle between the actual moving direction Tn and the predetermined moving direction Tm; and step S123) comprising controlling the robot to deflect left or right by a proportion integration differentiation (PID) method, according to the deflection direction and the deflection angle needed for adjusting the robot.

* * * * *